United States Patent
Hioki et al.

(10) Patent No.: US 9,416,216 B2
(45) Date of Patent: *Aug. 16, 2016

(54) DIELECTRIC RESIN COMPOSITION FOR FILM CAPACITOR AND FILM CAPACITOR

(75) Inventors: Yasunori Hioki, Nagaokakyo (JP);
Tomomichi Ichikawa, Nagaokakyo (JP);
Norihiro Yoshikawa, Nagaokakyo (JP);
Ichiro Nakamura, Nagaokakyo (JP);
Ichiro Nakaso, Nagaokakyo (JP);
Shinichi Kobayashi, Nagaokakyo (JP);
Tomoki Inakura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/221,352

(22) Filed: Aug. 30, 2011

(65) Prior Publication Data

US 2011/0310527 A1   Dec. 22, 2011

Related U.S. Application Data

(63) Continuation of application No. PCT/JP2010/053395, filed on Mar. 3, 2010.

(30) Foreign Application Priority Data

Mar. 5, 2009 (JP) ................................. 2009-051523

(51) Int. Cl.
C08L 29/04 (2006.01)
H01G 4/14 (2006.01)
C08G 18/62 (2006.01)
C09D 175/04 (2006.01)
H01G 4/18 (2006.01)
H01G 4/30 (2006.01)

(52) U.S. Cl.
CPC .......... *C08G 18/6212* (2013.01); *C09D 175/04* (2013.01); *H01G 4/18* (2013.01); *H01G 4/30* (2013.01)

(58) Field of Classification Search
CPC .... C08G 18/6212; C09D 175/04; H01G 4/18; H01G 4/30
USPC ........................ 361/311; 524/503; 525/58, 61; 428/423.1
See application file for complete search history.

(56) References Cited

U.S. PATENT DOCUMENTS

| | | | |
|---|---|---|---|
| 3,069,379 A | 12/1962 | Lavin et al. | |
| 5,738,926 A * | 4/1998 | Kinoshita | 428/141 |
| 6,403,263 B1 | 6/2002 | Roach | |
| 7,635,519 B2 | 12/2009 | Onoue et al. | |
| 2007/0117913 A1* | 5/2007 | Tan et al. | 524/544 |
| 2007/0299164 A1* | 12/2007 | Hayashi et al. | 523/457 |
| 2008/0014430 A1 | 1/2008 | Onoue et al. | |

FOREIGN PATENT DOCUMENTS

| | | | | |
|---|---|---|---|---|
| GB | 755 942 A | | 8/1956 | |
| JP | 05-058021 | * | 9/1993 | ............ B41M 5/20 |
| JP | 10-119127 A | | 5/1998 | |
| JP | 2005-220154 A | | 8/2005 | |
| JP | 2008-171761 A | | 7/2008 | |
| JP | 2008-229849 A | | 10/2008 | |
| JP | 2008229849 A | * | 10/2008 | |
| JP | 2010-283164 A | | 12/2010 | |
| WO | WO-2006-100833 A1 | | 9/2006 | |

OTHER PUBLICATIONS

International Search Report, mailed Jun. 8, 2010.
Extended Search Report issued from European Patent Office for corresponding EP 10 74 8764, mailed Jan. 4, 2013.

* cited by examiner

*Primary Examiner* — Alexa Neckel
*Assistant Examiner* — Marie Reddick
(74) *Attorney, Agent, or Firm* — Arent Fox LLP

(57) ABSTRACT

To increase the heat resistance of a film capacitor, a cured article obtained by curing a mixed solution of a polyvinyl acetal having a hydroxyl group content of 10% to 38% by weight, the number of backbone carbon atoms of the polyvinyl acetal being 100 or more, and a polyisocyanate having an isocyanate content of 1% to 50% by weight is used as a dielectric resin films material arranged between first and second counter electrodes facing each other. At least the polyvinyl acetal is subjected to high-pressure homogenization in which a shearing force is applied such that a pressure applied to the polyvinyl acetal is 50 MPa or more when the material is passed through a path having a diameter of 0.125 mm and a length of 5 mm, so that the solubility is increased to allow a curing reaction to proceed uniformly. The cured article has a glass transition temperature of 130° C. or higher and a breakdown voltage of 350 V/µm or more.

10 Claims, 1 Drawing Sheet

DIELECTRIC RESIN COMPOSITION FOR FILM CAPACITOR AND FILM CAPACITOR

This is a continuation-in-part of application Serial No. PCT/JP2010/053395, filed Mar. 3, 2010, the contents of which is incorporated herein by reference.

TECHNICAL FIELD

The present invention relates to a dielectric resin composition for a film capacitor, a method for producing the dielectric resin composition, and a film capacitor including the dielectric resin composition for a film capacitor. The invention provides improvements in heat resistance of a film capacitor.

BACKGROUND ART

A film capacitor is a type of capacitor which includes flexible resin films serving as a dielectric and metal films serving as first and second counter electrodes, the resin films being interposed between the metal films that face each other, and the metal films being arranged on both main surfaces of the resin films. The film capacitor usually has a cylindrical shape obtained by winding the dielectric resin films. First and second external terminal electrodes are formed on opposing first and second end faces of the cylinder. The first counter electrode is electrically connected to the first external terminal electrode. The second counter electrode is electrically connected to the second external terminal electrode.

In such a film capacitor, films mainly composed of polypropylene are commonly used as the dielectric resin films from the viewpoint of electrical characteristics, formability, and handleability, as described in, for example, Japanese Unexamined Patent Application Publication No. 10-119127 (PTL 1).

However, where a thermoplastic resin, such as polypropylene, is used as a main component for the dielectric resin films, there is a problem of heat resistance. That is, such dielectric resin films are not suitable for high temperature applications, for example, use in engine compartments of automobiles.

Furthermore, it is necessary to reduce the thickness of the layer of a dielectric resin film to satisfy the recent demand for miniaturization from the market. A film mainly composed of polypropylene is produced through steps of thermally melting a material and drawing the melted material into a sheet. For example, it is disadvantageously difficult to form a sheet having a stable thickness at a thickness of less than 2.5 µm, because the degree of technical difficulty is increased.

International Publication No. 2006/100833 (PTL 2) teaches the use of polyisocyanate-crosslinked polyvinyl acetal as the main component for the dielectric resin films in place of polypropylene and that a coupling agent surface treated high dielectric constant filler is added in order to increase the dielectric constant of the resin. Polyvinyl acetal is thermosetting and can be dissolved in a solvent. So, unlike polypropylene, a thin-layer sheet can be formed without thermal melting or drawing.

However, variations of properties over the same film are likely to be relatively large for the dielectric resin films disclosed in PTL 2. Thus, even if the dielectric resin films as disclosed in PTL 2 are used, a guaranteed heat resistance for the same production lot, i.e., a guaranteed withstand voltage, is disadvantageously reduced at a specific temperature.

PATENT LITERATURE

PTL 1: Japanese Unexamined Patent Application Publication No. 10-119127
PTL 2: International Publication No. 2006/100833

SUMMARY OF INVENTION

Technical Problem

It is an object of the present invention to provide a dielectric resin composition for a film capacitor, the dielectric resin composition being capable of solving the foregoing problems, and a method for producing the same.

It is another object of the present invention to provide a film capacitor including the foregoing dielectric resin composition for a film capacitor.

Solution to Problem

The present invention is directed to a dielectric resin composition for a film capacitor. To overcome the foregoing technical problems, the dielectric resin composition for a film capacitor has a structure described below.

That is, a dielectric resin composition for a film capacitor according to the present invention is cured by mixing and crosslinking two or more organic materials containing at least first and second organic materials having functional groups that react with each other, thereby providing a cured article in which the number of carbon atom repetitions of at least the first organic material in the direction of its linear chain is 100 or more, and the cured article has a glass transition temperature of 130° C. or higher and a breakdown voltage of 350 V/µm or more.

According to another aspect of the present invention, as described above, a dielectric resin composition for a film capacitor is cured by mixing and crosslinking two or more organic materials containing at least first and second organic materials having functional groups that react with each other, thereby providing a cured article in which the number of carbon atom repetitions of at least the first organic material in the direction of its linear chain is 100 or more, and the average maximum length of phase-separated regions measured with a scanning probe microscope in a phase-lag measurement mode is 100 nm or less.

In the dielectric resin composition for a film capacitor according to the present invention, preferably, the first organic material is a polyvinyl acetal, the cured article has a polyvinyl acetal content of 20% by weight or more, and the second organic material is a polyisocyanate having isocyanate groups.

More preferably, the polyvinyl acetal has a hydroxyl group content of 10% to 38% by weight, the polyisocyanate has an isocyanate group content of 1% to 50% by weight, and the cured article has a polyvinyl acetal content of 20% to 90% by weight.

Still more preferably, the polyvinyl acetal is a polyvinyl acetoacetal, and the isocyanate is tolylene diisocyanate.

In the dielectric resin composition for a film capacitor according to the present invention, preferably, the standard deviation of the softening-point distribution in the cured article is 50° C. or lower.

The dielectric resin composition for a film capacitor according to the present invention may further contain a filler in an amount of 30% by volume or less, the filler having a dielectric constant within ±10 of the dielectric constant of the cured article. If the filler has been treated with a coupling agent, it becomes a part of the crosslinked product while maintaining the breakdown voltage of the dielectric resin composition. Untreated filler can be employed. In both cases, the filler provides good slip to films made from the composition and act to prevents cohesion between films.

The present invention is also directed to a film capacitor including the foregoing dielectric resin composition for a film capacitor. A film capacitor includes a dielectric resin film obtained by curing the foregoing dielectric resin composition for a film capacitor and first and second counter electrodes facing each other with the dielectric resin film provided therebetween.

Furthermore, the present invention is directed to a method for producing a dielectric resin composition for a film capacitor.

One method for producing a dielectric resin composition for a film capacitor according to the present invention includes the steps of preparing a first organic material having a predetermined functional group, the number of carbon atom repetitions of the first organic material being 100 or more; preparing a second organic material having a functional group reactive with the functional group of the first organic material; subjecting at least the first organic material to high-pressure homogenization in which a shearing force is applied to the first organic material in such a manner that a pressure applied to the first organic material is 50 MPa or more when the first organic material is passed through a path having a diameter of 0.125 mm and a length of 5 mm; and forming a mixed solution of at least the first organic material and the second organic material. To form a dielectric resin film used for a film capacitor, the steps of forming the mixed solution into a film and curing the film are performed.

Advantageous Effects of Invention

The use of the dielectric resin composition for a film capacitor according to the present invention enables providing a cured article having a glass transition temperature of 130° C. or higher. As a result, the dielectric resin film has high heat resistance. It is thus possible to increase the guaranteed temperature of a film capacitor including the dielectric resin film. Furthermore, when counter electrodes are formed by evaporation in order to produce a film capacitor including the dielectric resin film, the evaporation step may be performed without cooling the dielectric resin film because the dielectric resin film has high heat resistance as described above.

In the dielectric resin composition for a film capacitor according to the present invention, the cured article has a breakdown voltage of 350 V/μm or more. Consequently, the dielectric resin film including the dielectric resin composition has a high breakdown voltage. It is thus possible to reduce the thickness of the dielectric resin film while a predetermined breakdown voltage is maintained, thereby leading to a reduction in the size of the film capacitor.

In the dielectric resin composition for a film capacitor according to the present invention, the number of carbon atom repetitions of the first organic material in the direction of its linear chain is 100 or more. In other words, the first organic material has a backbone containing at least 100 carbons. All of the carbon atoms in any cyclic structure are counted, but no carbon atoms in any pendent group are included in the at least 100 carbon atoms. As a result, the dielectric resin film formed from the dielectric resin composition has sufficient flexibility and can be suitably used as a dielectric resin film included in a wound film capacitor.

In the dielectric resin composition for a film capacitor according to the present invention, the cured article has a polyvinyl acetal content of 20% by weight or more in the case where the first organic material is a polyvinyl acetal, and the second organic material is a polyisocyanate, in particular, the breakdown voltage is increased. It is thus possible to reduce the thickness of the dielectric resin film in the film capacitor, thereby advantageously leading to a reduction in the size of the film capacitor.

In the case where the polyvinyl acetal has a hydroxyl group content of 10% to 38% by weight, the polyisocyanate has an isocyanate group content of 1% to 50% by weight, and the cured article has a polyvinyl acetal content of 20% to 90% by weight, the cured article has a higher crosslink density. Consequently, the dielectric resin film has a higher breakdown voltage.

In the case where the dielectric resin composition for a film capacitor according to the present invention further contains a filler and, if the filler has a high dielectric constant, the electric field is applied only to the resin portion when an electric field is applied to the resulting dielectric resin film. The resin portion is likely to be damaged, thereby reducing the breakdown voltage, in some cases. However, in the case where the filler has a dielectric constant within ±10 of the resin portion of the combination, and where the filler content is 30% by volume or less, the concentration of the electric field can be circumvented, thereby providing a breakdown voltage comparable to that of a cured article without a filler. Use of a filler in this manner and minor amount is not designed to significantly increase the dielectric constant of the composition. Furthermore, irregularities can be formed on a surface of the dielectric resin film to provide satisfactory sliding properties. As a result, the winding operation of the dielectric resin film for the production of a wound film capacitor can be performed smoothly.

In the method for producing a dielectric resin composition according to the present invention, the first organic material in which the number of carbon atom repetitions is 100 or more is subjected to the high-pressure homogenization in which a predetermined shearing force is applied. The solubility of the first organic material is thus increased to improve the mutual solubility of the two or more organic materials containing the first and second organic materials, thereby allowing the curing reaction to proceed uniformly. This makes it possible to improve the breakdown voltage of the resulting dielectric resin film.

DESCRIPTION OF EMBODIMENTS

A film capacitor including a dielectric resin composition according to the present invention will be described below with reference to FIG. 1.

Figure 1:
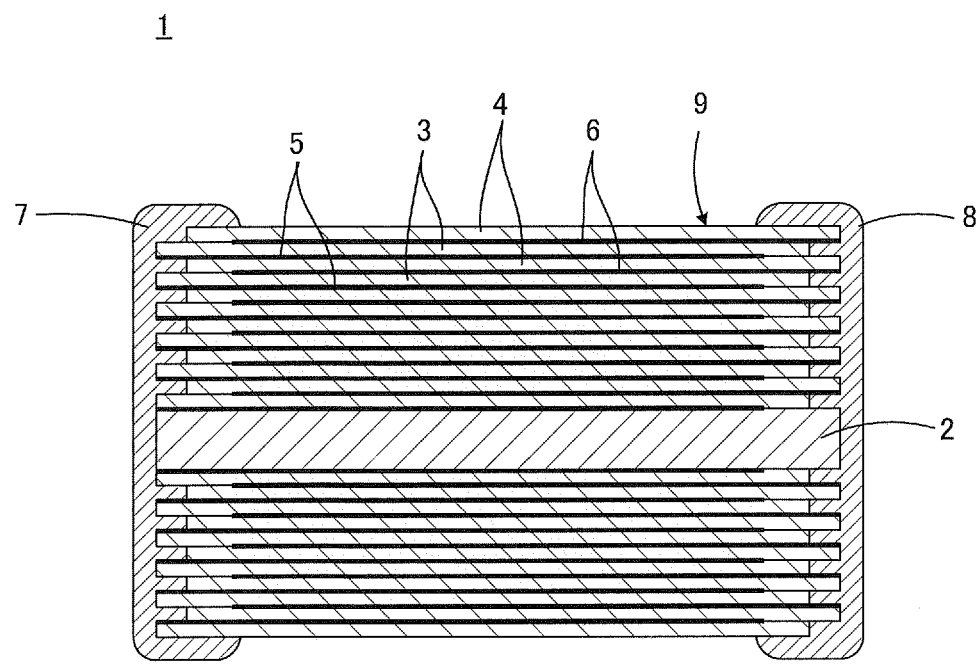
FIG. 1 is a longitudinal sectional view of an exemplary film capacitor including a dielectric resin composition according to the present invention.

Briefly, a wound film capacitor 1 illustrated in FIG. 1 includes first and second dielectric resin films 3 and 4 wound around a wound core 2; first and second counter electrodes 5 and 6 facing each other with the first or second dielectric resin film 3 or 4 provided therebetween; and first and second external terminal electrodes 7 and 8 electrically connected to the first and second counter electrodes 5 and 6, respectively.

More specifically, the first counter electrode 5 is arranged on the first dielectric resin film 3. The second counter electrode 6 is arranged on the second dielectric resin film 4. The first counter electrode 5 is arranged so as to reach one side end of the first dielectric resin film 3 and not to reach the other side end. The second counter electrode 6 is arranged so as not to reach one side end of the second dielectric resin film 4 and to reach the other end.

The first and second dielectric resin films 3 and 4 are wound around the wound core 2 so as to be stacked. As illustrated in FIG. 1, the first dielectric resin film 3 and the second dielectric resin film 4 are mutually displaced in the width direction in such a manner that an end portion of the first counter electrode 5 which reaches the one side end of the first dielectric resin film 3 is exposed and in such a manner that an end portion of the second counter electrode 6 which reaches the one side end of the second dielectric resin film 4 is exposed. As described above, the first and second dielectric resin films 3 and 4 are wound around the wound core 2, thereby providing a substantially cylindrical capacitor main body 9.

For the film capacitor 1 illustrated in FIG. 1, the second dielectric resin film 4 is located outside the first dielectric resin film 3, and the first and second counter electrodes 5 and 6 are located inside the first and second dielectric resin films 3 and 4, respectively.

The first and second external terminal electrodes 7 and 8 are formed by, for example, thermal spraying of zinc on end faces of the substantially cylindrical capacitor main body 9 as described above. The first external terminal electrode 7 is in contact with the exposed end portion of the first counter electrode 5 to be electrically connected to the first counter electrode 5. The second external terminal electrode 8 is in contact with the exposed end portion of the second counter electrode 6 to be electrically connected to the second counter electrode 6.

The dielectric resin films 3 and 4 included in the film capacitor 1 are formed of films obtained by curing a dielectric resin composition according to the present invention.

The dielectric resin composition for a film capacitor is cured by mixing and crosslinking two or more organic materials containing at least first and second organic materials having functional groups that react with each other, thereby providing a cured article. The number of carbon atoms of at least the first organic material in the direction of its linear chain, i.e., its backbone, is 100 or more. The cured article of the dielectric resin composition has a glass transition temperature of 130° C. or higher and a breakdown voltage of 350 V/μm or more.

The dielectric resin composition is produced as described below.

The first organic material and the second organic material are prepared. Other organic material may be prepared, as needed.

At least the first organic material is subjected to high-pressure homogenization in which a shearing force is applied to the first organic material such that the pressure applied to the first organic material is 50 MPa or more when the first organic material is passed through a path having a diameter of 0.125 mm and a length of 5 mm.

Next, a mixed solution of at least the first and second organic materials is produced. At this time, at least the first organic material has been subjected to high-pressure homogenization and thus has increased solubility, thereby resulting in improved mutual solubility of the two or more organic materials containing the first and second organic materials.

To produce the dielectric resin films 3 and 4 for the film capacitor 1, the mixed solution is formed into a film and cured. At this time, the two or more organic materials containing the first and second organic materials have increased mutual solubility. This allows a curing reaction to proceed uniformly, thereby resulting in the dielectric resin films 3 and 4 having an improved breakdown voltage.

In the foregoing description, the first organic material is subjected to high-pressure homogenization before the preparation of the mixed solution. Alternatively, the mixed solution, which also contains the second organic material, may be prepared and then subjected to high-pressure homogenization. It is speculated that the high-pressure homogenization is more effective in the latter case.

In the case of mixing two or more organic materials, a nanometer- to micrometer-sized microphase-separated structure is commonly known to be formed, depending on the mutual solubility of the organic materials.

The dielectric resin composition for a film capacitor according to the present invention is obtained by mixing two or more organic materials and thus also has a phase-separated structure as described above. In particular, it was found that the dielectric resin composition according to the present invention has at least two phases having different physical properties: for example, a very hard phase and a very soft phase as compared to an average hardness.

The inventors have conceived that the foregoing phase-separated structure may be used as a method for defining the denotation of the dielectric resin composition for a film capacitor according to the present invention, without using properties, such as the glass transition temperature or breakdown voltage of the cured article as described above. Experiments (see Experiment Example 4 described below) were performed and demonstrated this.

In the case of producing the dielectric resin composition for a film capacitor according to the present invention described above, at least the first organic material is subjected to high-pressure homogenization. It was found that with respect to the uncured dielectric resin composition obtained by performing the high-pressure homogenization, the average maximum length of "phase-separated regions" each including at least two phases having different properties, for example, a very hard phase and a very soft phase as compared with an average hardness, was determined and found to be 100 nm or less. Thus, the dielectric resin composition according to the present invention may also be defined by the condition in which the average maximum length of the phase-separated regions is 100 nm or less.

For the dielectric resin composition according to the present invention, preferably, a polyvinyl acetal is used as the first organic material, and a polyisocyanate is used as the second organic material. Furthermore, the cured article of the dielectric resin composition preferably has a polyvinyl acetal content of 20% by weight or more.

More preferably, the polyvinylacetal has a hydroxyl group content of 10% to 38% by weight, the polyisocyanate has an isocyanate group content of 1% to 50% by weight, and the cured article has a polyvinyl acetal content of 20% to 90% by weight.

Under the condition in which the polyvinyl acetal is present in an amount of 20% to 90% by weight as described above, an organic material which has a functional group reactive with a hydroxy group or an isocyanate group and which partially constitutes the crosslinked structure of a cured article may also be present. Examples of the organic material include resins having an epoxy group, a silanol group, or a carboxy group.

The cured article preferably has a polyvinyl acetal content of 30% to 80% by weight and more preferably 40% to 70% by weight. In particular, at a polyvinyl acetal content of 40% to 70% by weight, the resulting dielectric resin film exhibits a yield stress of 60 MPa or more and an elongation at break of 20% or more in a tensile test. This facilitates the transfer and handling of the dielectric resin film during the production of a wound film capacitor, thereby improving productivity.

When the polyvinyl acetal content is 20% by weight or more and less than 40% by weight, the elongation at break is less than 20%, resulting in a reduction in brittleness. When the polyvinyl acetal content is more than 70% by weight and 90% by weight or less, some hydroxy groups among hydroxy groups included in the polyvinyl acetal do not undergo a crosslinking reaction. As a result, the resulting dielectric resin film has a breakdown voltage of 350 V/μm to 400 V/μm, which is somewhat lower than the maximum breakdown voltage, 475 V/μm, measured in Examples described below.

As the polyvinyl acetal described above, for example, a polyvinyl acetoacetal is used. As the isocyanate, for example, tolylene diisocyanate is used.

The standard deviation of the softening-point distribution in a cured article of the dielectric resin composition for a film capacitor according to the present invention is preferably 50° C. or lower. The standard deviation of the softening-point distribution serves as an index to evaluate whether two or more organic materials are uniformly dispersed. For example, an ultrafine probe is pressed against a test film at regular intervals, the film being produced by thermally curing the polyvinyl acetal of dielectric resin composition for a film capacitor according to the present invention. The displacement of the probe when the probe is rapidly heated is measured to determine the temperature at which the rapid displacement of the probe is caused by a softening of the film, i.e., a softening point. In the case where variations of the softening points among measurement positions are expressed by the standard deviation, the nonuniformity of the dielectric resin film may be defined by the standard deviation.

Furthermore, the dielectric resin composition according to the present invention may further contain a filler in an amount of 30% by volume or less, the filler having a dielectric constant within ±10 of the dielectric constant of a cured article.

Experimental Examples performed to confirm the effect of the present invention will be described below.

Experimental Examples 1

An organic material 1 having the number of backbone carbon atoms and the amount of hydroxy groups described in Table 1 was mixed with ethyl acetate. The mixture was stirred to prepare a resin solution having an organic material 1 concentration of 7% by weight.

A shearing force was applied to the resin solution by passing the resin solution once through an orifice having a diameter of 0.125 mm and a length of 5 mm of a high-pressure homogenizer at 150 MPa. The resin solution which has been subjected to high-pressure homogenization was passed five times through a filter having a pore size of 0.45 μm to remove foreign matter.

An organic material 2 having the amount of NCO groups (isocyanate groups) described in Table 1 was added to the resin solution containing the organic material 1 after removal of foreign matter as described above in such a manner that the solid content was set to a value described in "Proportion of organic material 1 in cured article" in Table 1. Stirring was performed to prepare a uniform mixed solution.

In section "Organic material 2" in Table 1, "TDI" represents methyl ethyl ketone (MEK) oxime-blocked tolylene diisocyanate trimethylpropanol (TMP) adduct. "MDI" represents diphenylmethane-4,4'-diisocyanate. "HDI" represents hexamethylene diisocyanate.

The resulting mixed solution was passed three times through a filter having a pore size of 0.45 μm to remove foreign matter.

The mixed solution was applied onto a polyethylene terephthalate (PET) sheet with a coater and dried to form a film having a thickness of 4 μm. The resulting film was cured in a hot-air oven at 180° C. for 1 hour.

As described in Table 1, the glass transition temperature, the breakdown voltage, the dielectric constant, and the dielectric loss of the resulting film as a cured article were evaluated. The glass transition temperature was measured with a differential thermal analysis. With respect to the breakdown voltage, an evaluation sample provided with electrodes formed by evaporation on surfaces of the film was used. A method for applying an electric field to the film was employed in which the sample was held at a field strength for 10 minutes for each field strength, the field strength being increased in steps of 25 V/μm. The field strength at which the electrostatic capacity was reduced by the breakage of the film to 0% of the initial value was defined as the breakdown voltage. In this measurement, five specimens for each sample were used. The value when the failure rate based on the Weibull distribution was 50% was used as a mean value of the breakdown voltage.

TABLE 1

| Sample | Organic material 1 | Number of carbon atom repetitions | Amount of hydroxy groups [% by weight] | Proportion of organic material 1 in cured article [% by weight] | Organic material 2 | Amount of NCO groups [% by weight] | Glass transition temperature [° C.] | Breakdown voltage [V/μm] | Dielectric constant $\epsilon_r$ at 1 kHz | Dielectric loss DF at 1 kHz |
|---|---|---|---|---|---|---|---|---|---|---|
| 1 | Polyvinyl acetoacetal | 16000 | 20 | 50 | TDI | 5 | 160 | 475 | 3.6 | 0.83 |
| 2 | Polyvinyl acetoacetal | 16000 | 10 | 50 | TDI | 5 | 150 | 450 | 3.5 | 0.79 |
| 3 | Polyvinyl acetoacetal | 16000 | 38 | 50 | TDI | 5 | 150 | 450 | 3.7 | 0.86 |
| 4 | Polyvinyl acetoacetal | 16000 | 20 | 50 | MDI | 1.4 | 132 | 425 | 3.6 | 0.8 |
| 5 | Polyvinyl acetoacetal | 16000 | 20 | 50 | HDI | 50 | 165 | 450 | 3.7 | 0.85 |
| 6 | Polyvinyl acetoacetal | 16000 | 20 | 20 | TDI | 5 | 132 | 350 | 3.8 | 0.8 |
| 7 | Polyvinyl acetoacetal | 16000 | 20 | 90 | TDI | 5 | 135 | 375 | 3.5 | 0.78 |
| 8 | Polyvinyl acetoacetal | 2400 | 20 | 50 | TDI | 5 | 160 | 475 | 3.6 | 0.83 |
| 9 | Polyvinyl acetoacetal | 19200 | 20 | 50 | TDI | 5 | 160 | 475 | 3.6 | 0.82 |
| 10 | Polyvinyl acetoacetal | 26400 | 20 | 50 | TDI | 5 | 160 | 475 | 3.6 | 0.82 |
| 11 | Epoxy | 100 | 10 | 50 | TDI | 5 | 160 | 400 | 3.8 | 0.8 |
| 12 | Polyvinyl acetoacetal | 95 | — | — | — | — | — | — | — | — |
| 13 | Polyvinyl acetoacetal | 16000 | 8 | 50 | TDI | 5 | 110 | 250 | 3.5 | 0.79 |
| 14 | Polyvinyl alcohol | 16000 | 39 | — | — | — | — | — | — | — |
| 15 | Polyvinyl acetoacetal | 16000 | 20 | 50 | MDI | 0.8 | 110 | 250 | 3.5 | 0.78 |
| 16 | Polyvinyl acetoacetal | 16000 | 20 | 50 | HDI | 52 | — | — | — | — |
| 17 | Polyvinyl acetoacetal | 16000 | 20 | 18 | TDI | 5 | — | — | — | — |
| 18 | Polyvinyl acetoacetal | 16000 | 20 | 92 | TDI | 5 | 125 | 300 | 3.5 | 0.78 |

In Table 1, samples 1 to 11 fall not only within the range of the present invention but also within the preferred range of the present invention in terms of the amount of hydroxy groups, the amount of NCO groups, and the proportion of the organic material 1 in the cured article. In each of samples 1 to 11, the glass transition temperature was 130° C. or higher, and the breakdown voltage was 350 V/μm or more.

In contrast, the number of backbone carbon atoms in organic material 1 was less than 100 for sample 12. Breakage occurred during formation to give small pieces, thus failing to form a film.

For sample 13, the amount of hydroxy groups was less than 10% by weight. The glass transition temperature was less than 130° C., and the breakdown voltage was less than 350 V/μm.

In sample 14, the amount of hydroxy groups exceeded 38% by weight. The organic material 1 was not dissolved in the organic solvent, thus failing to form a film.

For sample 15, the amount of NCO groups was less than 1% by weight. The glass transition temperature was less than 130° C., and the breakdown voltage was less than 350 V/μm.

The amount of NCO groups in sample 16 exceeded 50% by weight. An excessively high self-reaction rate of HDI caused gelation immediately after the mixing of polyvinyl acetoacetal and HDI, thus failing to form a film.

For sample 17, the proportion of the organic material 1 in a cured article was less than 20% by weight. Breakage occurred during formation to give small pieces, thus failing to form a film.

The proportion of the organic material 1 in a cured article in sample 18 exceeded 90% by weight. The glass transition temperature was less than 130° C., and the breakdown voltage was less than 350 V/μm.

Experimental Examples 2

The same mixed solution as that of sample 1 in Experimental Example 1 was prepared.

Silica particles having an average particle size of 0.2 μm (dielectric constant: 4) and a silane coupling agent were added to a solvent containing toluene and ethanol in a ratio of 1:1 by weight. The mixture was stirred in a ball mill for 8 hours to prepare a silica particle dispersion in which the silica particles subjected to surface treatment with the silane coupling agent were dispersed.

The mixed solution and the silica particle dispersion were mixed such that the volume concentration of silica was 30% by volume. The resulting mixture was charged into a high-pressure homogenizer. A shearing force was applied to the mixture by passing the mixture once through an orifice having a diameter of 0.125 mm and a length of 5 mm at 150 MPa.

The resulting mixture was subjected to the same operations as in Experimental Example 1 to provide a film as a cured article. The glass transition temperature and the breakdown voltage were evaluated. The results demonstrated that the glass transition temperature was 160° C. and that the breakdown voltage was 475 V/μm, which were equal to those of sample 1 in Experimental Example 1.

The film obtained in Experimental Example 2 was wound around a paper tube having a diameter of 4 inches without any difficulty because the surface of the film had satisfactory sliding properties.

Experimental Example 3

Experimental Example 3 examined preferred conditions of high-pressure homogenization for an organic material in which the number of backbone carbon atoms is 100 or more.

Specifically, the high-pressure homogenization sample 1 in Experimental Example 1 was performed under the conditions in which the polyvinyl acetoacetal solution serving as the organic material 1 was passed once through the orifice having a diameter of 0.125 mm and a length of 5 mm at 150 MPa. Then, the pressure and the number of passages were changed as described in Table 2. Variations of breakdown voltage and average breakdown voltages of the resulting films were compared.

TABLE 2

| Pressure | Number of passages | Variation of breakdown voltage | Average breakdown voltage |
|---|---|---|---|
| 25 MPa | 20 | Large | Low |
| 50 MPa | 20 | Small | Large |
| 150 MPa | 1 | Small | Large |

As is clear from Table 2, where the pressure is 150 MPa, it was sufficiently high that a sufficient dispersion state could be provided even if the number of passages is set to 1, resulting in small variations of breakdown voltage and a large average breakdown voltage.

Where the pressure is 50 MPa, a target dispersion state can be provided as long as the number of passages is increased, resulting in resulting in small variations of breakdown voltage and a large average breakdown voltage.

In contrast, where the pressure is 25 MPa, a reduction in the variations of breakdown voltage and improvement in the average breakdown voltage are not achieved because of its insufficient pressure even if the number of passages is increased.

Experimental Example 4

In Experimental Example 4, phase-separated structure and a softening point after curing were evaluated and correlated with a breakdown voltage in a dielectric resin composition subjected to high-pressure homogenization.

Specifically, a high-pressure homogenization was performed under the conditions in which the polyvinyl acetoacetal solution serving as the organic material 1 was passed once through the orifice having a diameter of 0.125 mm and a length of 5 mm at 150 MPa. The pressure and the number of passages during the high-pressure homogenization were changed as described in "Operating pressure of high-pressure homogenizer" and "Number of passages" of Table 3 below. The phase-separated structure of an uncured film, in particular, the average maximum length of phase-separated regions, was determined. The softening point of a cured film surface and the breakdown voltage were determined. Table 1 also shows data for sample 1 produced in Experimental Example 1.

The average maximum length of the phase-separated regions described in Table 3 was determined as described below.

As reported in, for example, Japanese Patent No. 4029356, the phase-separated structure was evaluated with a scanning probe microscope (SPM) in a phase-lag measurement mode.

Here, the phase-lag measurement is usually performed simultaneously with surface morphology observation, so that the local viscoelasticity of a surface can be evaluated.

With respect to a phase image obtained by the SPM, a larger phase lag results in a brighter image, and a smaller phase lag results in a darker image. A small phase lag indicates that the phase is harder than other phases. A large phase lag indicates that the phase is softer than other phases. In the case where a plurality of resin phases having different physical properties are present on a surface, the phase-separated structure can be evaluated by this measurement method.

The phase-separated regions were determined from the phase image measured in the foregoing phase-lag measurement mode on the basis of criteria described below. The phase-separated regions indicate a region with a significantly large phase lag and a region with a significantly small phase lag. In fact, the maximum and minimum values of the phase lag were measured. Upon letting the average of the maximum and minimum values be the reference value (zero), letting the maximum value be +100%, and letting the minimum value be −100%, a region with a phase difference of +75% to +100% and a region with a phase difference of −75% to −100% were regarded as the phase-separated regions.

Figure 2:
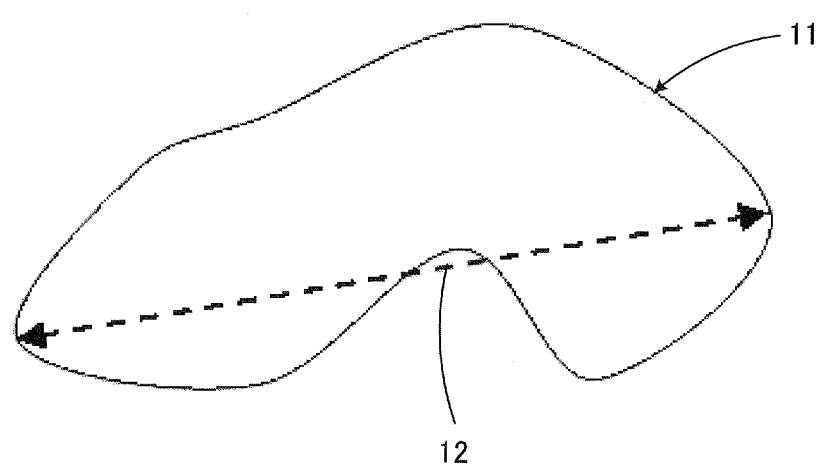
FIG. 2 is an explanatory view of a method for determining the maximum length of a phase-separated region defined in Example 4.

In the case of the analysis of the phase-separated regions, as illustrated in FIG. 2, the maximum length 12 was measured when a phase-separated region 11 was regarded as a continuous structure. An average maximum length was calculated from the phase-separated regions in the SPM phase image. Table 3 shows the results.

The softening point of the film surface described in Table 3 was measured with a local thermal analysis system (VESTA system, manufactured by Nihon Thermal Consulting Co). Measurement was performed at 25 points spaced at intervals of 500 nm in a 2 μm×2 μm region with a probe having a tip diameter of 30 nm. The softening point was measured as follows: The tip of the probe was brought into contact with a surface of a sample. The temperature of the tip was increased at a constant rate while the pressure at the tip of the probe was maintained at a constant value. The displacement of the probe in contact with the film was measured. The temperature at which the maximum displacement of the probe was observed was defined as the softening point of the film surface. As described in Table 3, the maximum and minimum softening points were determined. The standard deviation of the distribution of the softening points at the measurement positions was calculated.

The breakdown voltage described in Table 3 was determined in the same way as the average breakdown voltage determined in Experimental Example 1.

In contrast, the pressure applied by the high-pressure homogenizer in sample 21 is 25 MPa. Even if high-pressure homogenization is performed 20 times, the effect of the high-pressure homogenization is small. The maximum length of the phase-separated regions exceeds 100 nm. The standard deviation of the softening point of the film surface exceeds 50° C. The breakdown voltage is as low as less than 350 V/μm.

As is clear from the results of sample 21, where the high-pressure homogenization was performed at a low pressure, the target dispersion state was not provided, thus resulting in a nonuniform cured state and an increase in the standard deviation of the softening point. The nonuniform cured state did not result in a high breakdown voltage throughout the film.

REFERENCE NUMBER LIST 1 film capacitor
3, 4 dielectric resin film
5, 6 counter electrode
11 phase-separated region
12 maximum length

The invention claimed is:

1. A dielectric resin composition for a film capacitor, the dielectric resin composition comprising:
at least first and second organic materials, the first organic material having a first functional group and the second organic material having a second functional group, the first and second functional groups reacting with each other to form a crosslinked article,
wherein the first organic material is a polyvinyl acetal that has at least 2400 carbon atoms in its backbone chain and a hydroxyl group content of 10% to 38% by weight,
the second organic material is a polyisocyanate that has an isocyanate group content of 1% to 50% by weight, and
wherein the crosslinked article has a polyvinyl acetal content of 20% to 90% by weight, a glass transition temperature of 130° C. or higher measured with a differential thermal analysis, a breakdown voltage of 350 V/μm or more determined by application of an increasing electric field strength to a film until electrostatic capacity

TABLE 3

| Sample | Operating pressure of high-pressure homogenizer [MPa] | Number of passages | Average maximum length of phase-separated region [nm] | Softening point of film surface [° C.] | | | Breakdown voltage [V/μm] |
| --- | --- | --- | --- | --- | --- | --- | --- |
| | | | | min | max | Standard deviation | |
| 21 | 25 | 20 | 400 | 200 | 330 | 70 | 325 |
| 22 | 50 | 20 | 100 | 220 | 325 | 50 | 375 |
| 23 | 120 | 1 | 90 | 280 | 325 | 25 | 450 |
| 1 | 150 | 1 | 85 | 290 | 330 | 20 | 475 |

As is clear from Table 3, a higher pressure applied by the high-pressure homogenizer results in a smaller maximum length, a smaller standard deviation of the softening points of the film surface, and a higher breakdown voltage. It is thus speculated that a higher pressure applied by the high-pressure homogenizer resulted in a higher solubility of the organic materials and improvement in the mutual solubility of the organic materials, thereby allowing the reaction to occur uniformly and leading to an increase in breakdown voltage.

For each of samples 22, 23, and 1, the maximum length of the phase-separated regions is 100 nm or less. The standard deviation of the softening point of the film surface is 50° C. or lower. The breakdown voltage is as high as 350 V/μm or more.

was reduced by breakage of the film to 0% of an initial value, and a maximum length of phase-separated regions measured with a scanning probe microscope in a phase-lag measurement mode of 100 nm or less.

2. The dielectric resin composition for a film capacitor according to claim 1, wherein the polyvinyl acetal is a hydroxyl group-containing polyvinyl acetoacetal, and the polvisocvanate is tolylene diisocyanate.

3. The dielectric resin composition for a film capacitor according to claim 2, wherein the standard deviation of a softening-point distribution on a surface of the crosslinked article is 50° C. or lower.

4. The dielectric resin composition for a film capacitor according to claim 2, further comprising a filler in an amount of 30% by volume or less, and the filler has a dielectric constant within ±10 of the dielectric constant of the polyvinyl acetoacetal in the crosslinked article.

5. The dielectric resin composition for a film capacitor according to claim 1, wherein the standard deviation of a softening-point distribution on a surface of the crosslinked article is 50° C. or lower.

6. The dielectric resin composition for a film capacitor according to claim 1, wherein the polyisocyanate is a diisocyanate.

7. A film capacitor comprising:
a dielectric resin composition comprising at least first and second organic materials, the first organic material having a first functional group and the second organic material having a second functional group, the first and second functional groups reacting with each other to form a crosslinked article,
wherein the first organic material is a polyvinyl acetal that has at least 2400 carbon atoms in its backbone chain and a hydroxyl group content of 10% to 38% by weight,
the second organic material is a polyisocyanate that has an isocyanate group content of 1% to 50% by weight, and
wherein (a) the crosslinked article has a polyvinyl acetal content of 20% to 90% by weight, a glass transition temperature of 130° C. or higher measured with a differential thermal analysis, and a breakdown voltage of 350 V/μm or more determined by application of an increasing electric field strength until electrostatic capacity was reduced to 0% of an initial value, or (b) the crosslinked article has an average maximum length of phase-separated regions measured with a scanning probe microscope in a phase-lag measurement mode is 100 nm or less, or (c) the crosslinked article has a polyvinyl acetal content of 20% to 90% by weight, a glass transition temperature of 130° C. or higher measured with a differential thermal analysis, a breakdown voltage of 350 V/μm or more determined by application of an increasing electric field strength to a film until electrostatic capacity was reduced by breakage of the film to 0% of an initial value, and a maximum length of phase-separated regions measured with a scanning probe microscope in a phase-lag measurement mode of 100 nm or less; and
first and second counter electrodes facing each other with the crosslinked article disposed therebetween.

8. A film capacitor according to claim 7, wherein the crosslinked article has an average maximum length of phase-separated regions measured with a scanning probe microscope in a phase-lag measurement mode of 100 nm or less.

9. A film capacitor according to claim 8, wherein the crosslinked article has a polyvinyl acetal content of 20% to 90% by weight, a glass transition temperature of 130° C. or higher measured with a differential thermal analysis, a breakdown voltage of 350 V/μm or more determined by application of an increasing electric field strength to a film until electrostatic capacity was reduced by breakage of the film to 0% of an initial value, and a maximum length of phase-separated regions measured with a scanning probe microscope in a phase-lag measurement mode of 100 nm or less.

10. A film capacitor according to claim 8, wherein the first organic material is a hydroxyl group-containing polyvinyl acetoacetal; the second organic material is a tolylene diisocyanate; the standard deviation of a softening-point distribution on a surface of the crosslinked article is 50° C. or lower; and the dielectric resin composition further comprises a filler in an amount of 30% by volume or less, the filler having a dielectric constant within ±10 of the dielectric constant of the polyvinyl acetoacetal in the crosslinked article.

* * * * *